US012663044B2

(12) United States Patent
Baracca et al.

(10) Patent No.: US 12,663,044 B2
(45) Date of Patent: Jun. 23, 2026

---

(54) BEARING UNIT

(71) Applicant: Aktiebolaget SKF, Gothenburg (SE)

(72) Inventors: Fausto Baracca, Massa (IT); Andrea A. Bertolini, Carrara (IT); Alessio Nebbia Colomba, Pisa (IT)

(73) Assignee: Aktiebolaget SKF

( * ) Notice: Subject to any disclaimer, the term of this patent is extended or adjusted under 35 U.S.C. 154(b) by 41 days.

(21) Appl. No.: 18/618,230

(22) Filed: Mar. 27, 2024

(65) Prior Publication Data

US 2024/0328459 A1      Oct. 3, 2024

(30) Foreign Application Priority Data

Apr. 3, 2023    (IT) ........................ 102023000006525

(51) Int. Cl.
| | |
|---|---|
| *F16C 19/16* | (2006.01) |
| *B23D 57/00* | (2006.01) |
| *F16C 13/00* | (2006.01) |
| *F16C 33/34* | (2006.01) |
| *F16C 33/58* | (2006.01) |
| *F16C 33/66* | (2006.01) |

(52) U.S. Cl.
CPC ........ *F16C 33/585* (2013.01); *B23D 57/0053* (2013.01); *F16C 13/006* (2013.01); *F16C 19/163* (2013.01); *F16C 33/34* (2013.01); *F16C 33/6614* (2013.01); *F16C 2240/34* (2013.01); *F16C 2240/76* (2013.01); *F16C 2322/34* (2013.01)

(58) Field of Classification Search
CPC ...... F16C 19/06; F16C 19/163; F16C 19/166; F16C 33/585; F16C 33/6614; F16C 2240/34; F16C 2240/76; F16C 13/006; F16C 2322/34
See application file for complete search history.

(56) References Cited

U.S. PATENT DOCUMENTS

| | | | | |
|---|---|---|---|---|
| 5,740,893 | A | * | 4/1998 | Yamamoto ............ F16D 41/064 |
| | | | | 192/45.019 |
| 6,299,357 | B1 | | 10/2001 | Takata et al. |

(Continued)

FOREIGN PATENT DOCUMENTS

| | | | | | |
|---|---|---|---|---|---|
| CN | 101493118 A | * | 7/2009 | ............ | F16C 33/585 |
| JP | H07243439 A | * | 9/1995 | ......... | F16C 33/6677 |
| JP | H11247863 A | * | 9/1999 | ............ | F16C 19/166 |

(Continued)

OTHER PUBLICATIONS

JP2003049848_A_Description.*

(Continued)

*Primary Examiner* — Phillip A Johnson
(74) *Attorney, Agent, or Firm* — Stinson LLP

(57) ABSTRACT

A bearing unit (10, 10') has a radially outer ring (31). The outer ring (31) is rotatable with respect to an axis of rotation (X) and is provided with a radially inner raceway (31r). A stationary radially inner ring (33) is provided with a radially outer raceway (33r). A row (132) of rolling bodies (32) is interposed between the radially outer ring (31) and the radially inner ring (33). Each rolling body (32) has three contact points (P1, P2, P3) with the raceways (31r, 33r) of the radially outer ring (31) and, respectively, the radially inner ring (33).

10 Claims, 4 Drawing Sheets

(56)                    References Cited

U.S. PATENT DOCUMENTS

2005/0037877  A1*    2/2005   Ishiguro ................ F16C 33/585
                                                                474/70
2022/0018389  A1     1/2022   Baracca et al.

FOREIGN PATENT DOCUMENTS

| JP | 2003049848 | A | * | 2/2003 | .......... F16C 33/6614 |
| JP | 2003172362 | A | * | 6/2003 | ............ F16C 19/166 |
| JP | 2005321064 | A | * | 11/2005 | ............ F16C 19/166 |
| KR | 20170124661 | A | * | 11/2017 | ............. F16C 19/06 |

OTHER PUBLICATIONS

KR20170124661_A_Description.*
KR20170124661_A_Abstract.*
Examination Report of the National Intellectual Property Office of
Italy in Application No. 102023000006525, dated Oct. 30, 2023;
8pgs.

* cited by examiner

BEARING UNIT

CROSS-REFERENCE TO RELATED APPLICATION

This application claims priority to Italian Application No. 102023000006525, filed Apr. 3, 2023, the entirety of which is hereby incorporated by reference.

FIELD

The present disclosure relates to a bearing unit suitable for use in the manufacturing industry, and in particular for use in the marble cutting industry, and the present text makes reference to this industry, while being generally applicable.

BACKGROUND

The bearing units for use in the marble cutting industry are mounted beside one another along a respective common central axis of rotation and, even where the respective outer diameters thereof are relatively large, must have very small axial thicknesses. The combination of large diameters and reduced thicknesses requires particularly sophisticated technical solutions that are also costly, with the component parts thereof requiring reduced axial dimensions while guaranteeing consistently high performance. In particular, the bearing units are juxtaposed axially by means of stationary inner rings. On the other hand, the rotary outer rings have a slightly smaller axial dimension, on account of which they are not in contact with one another, but are able to oscillate slightly with respect to a plane of symmetry of the row of balls interposed between the outer ring and the inner ring.

In FIGS. 1 and 2, reference sign 1 denotes as a whole a bearing unit for marble cutting machines of a known type. The bearing unit 1 has an axis X of rotation and comprises a stationary radially inner ring 3, a radially outer ring 2, and a plurality of balls designed to roll inside a radially outer raceway formed on the radially inner ring 3 and a radially inner raceway formed on the radially outer ring 2 to enable the radially outer ring 2 to rotate at a rotation speed that may reach approximately 750 rpm in the marble industry.

The bearing unit 1 is connected to a pulley 5 coaxial with the axis X, and angularly integral with the radially outer ring 2 to guide a respective diamond wire 100 for cutting marble, in a known manner.

Typically, each ball 4 has a centre C of symmetry traversed radially by a plane Y of symmetry of the ball itself, transverse to the axis X, and has two contact points with the respective raceways of the rings 2 and 3 of the bearing unit 1: a point C1 between each ball 4 and the raceway of the outer ring 2 and a point C2 between each ball 4 and the raceway of the inner ring 3. The two contact points C1 and C2 of each ball 4 are aligned with the centre C of the related ball 4 along the related plane Y of symmetry.

The dynamic between the diamond wire 100 and the marble slab (not shown) is such that distributed forces act on the top of the pulley 5, the axial net force Fa of which is oriented parallel to the axis X, and the radial net force Fr of which is oriented towards the axis X and transverse to the axis X, and is also typically offset from the axis Y of the bearing unit 1. The action of said forces causes a resultant moment on the bearing unit 1 that can exert significant stress on the bearing unit, especially as a function of the value of the offset of the radial net force Fr. This creates a tilting moment that causes high contact pressures between the rings and the balls as a result of an excessive lever arm value, which adversely affect the service life of the bearing unit.

Applications in which bearing units incorporating raceways with two contact points, in which the inner ring is formed by two mirrored half-rings, are used to improve resistance to eccentric loads are also known. Although these bearing units (in which the contact points between the half-rings and the balls are not in the plane of symmetry of the ball) can withstand axial loads in both directions, said bearing units have larger axial dimensions than solutions with a single inner ring. This is problematic for use in marble cutting machines incorporating several bearings mounted axially in series with one another.

Moreover, the presence of just two contact points C1 and C2 (one contact point for each ring) generates greater axial play in the bearing unit than in the version with two contact points for each ring. This greater axial play in the bearing unit results in oscillation of the outer ring 2 that has greater freedom of movement and can therefore move more freely. This freedom of movement results in very significant oscillation of the pulley 5, which results in a poorly defined cut by the diamond wire 100 on the marble block, which generates a lot of waste.

SUMMARY

The present disclosure is therefore intended to provide a bearing unit that does not have the drawbacks described above.

The present disclosure provides a bearing unit having the features set out in the attached claims.

BRIEF DESCRIPTION OF THE DRAWINGS

The present disclosure is described below with reference to the attached drawings, which show some non-limiting example embodiments of the bearing unit, in which.

DETAILED DESCRIPTION

Figures 1, 2:
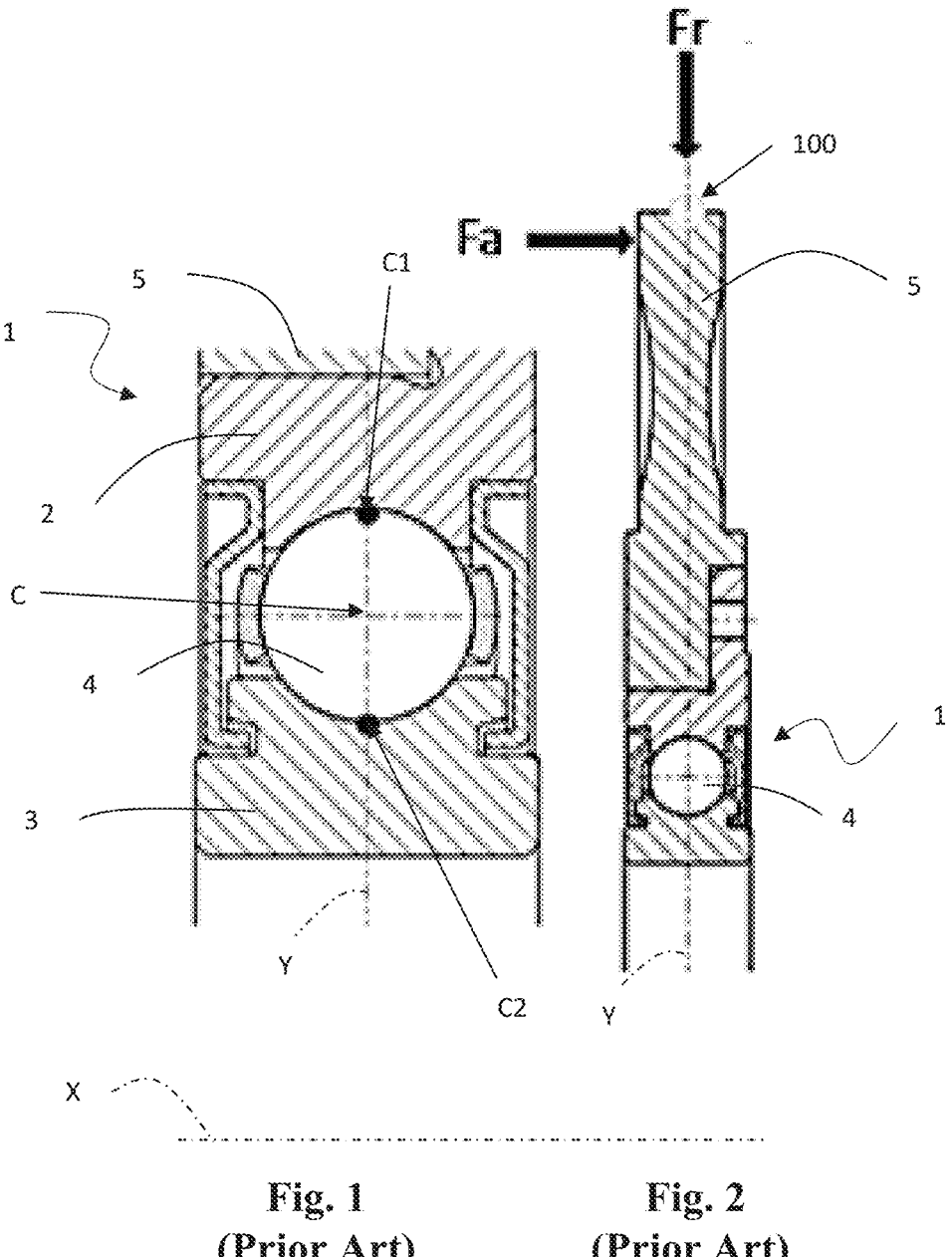
FIG. 1 is a cross-sectional view of a prior art bearing unit.
FIG. 2 is another cross-sectional view of the bearing unit of FIG. 1.
Figure 3:
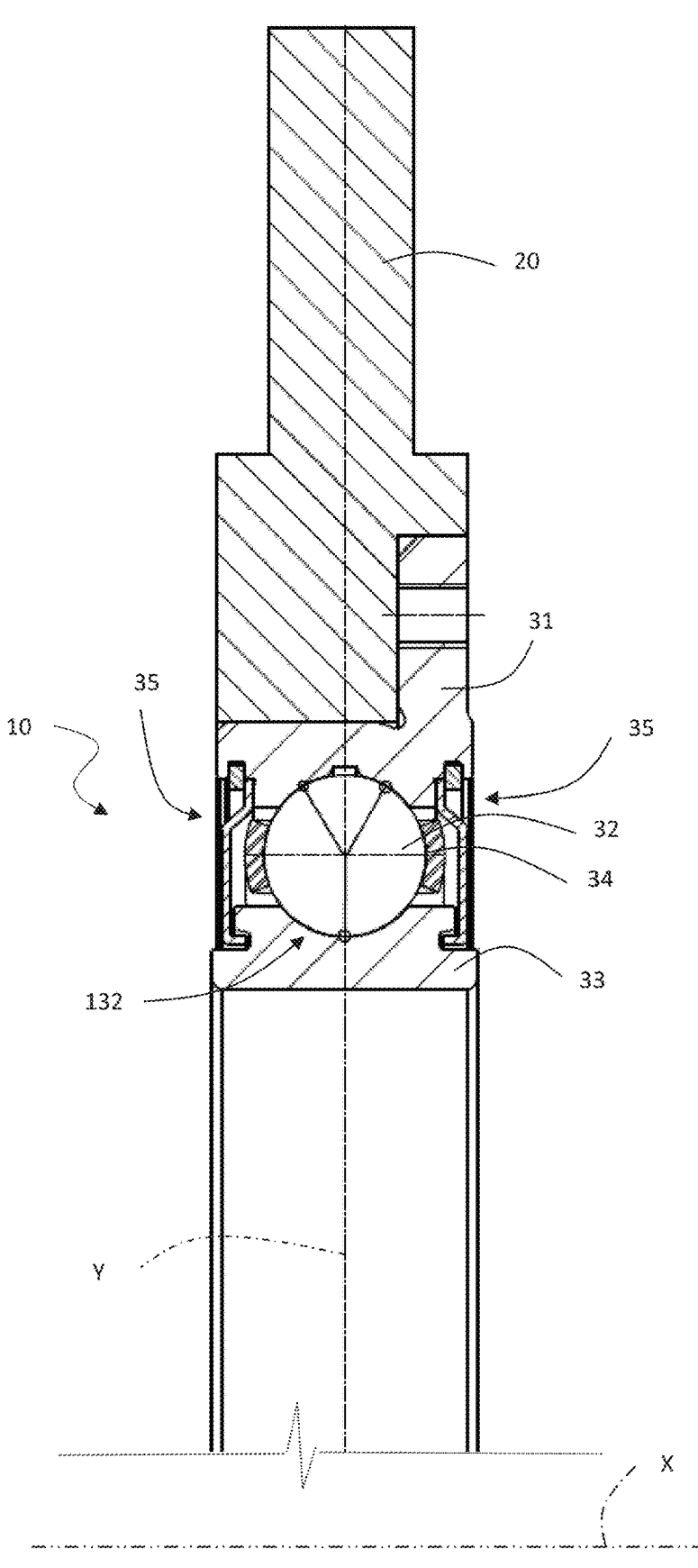
FIG. 3 is a cross-sectional view of a first and preferred embodiment of the bearing unit according to the present disclosure.
Figure 4:
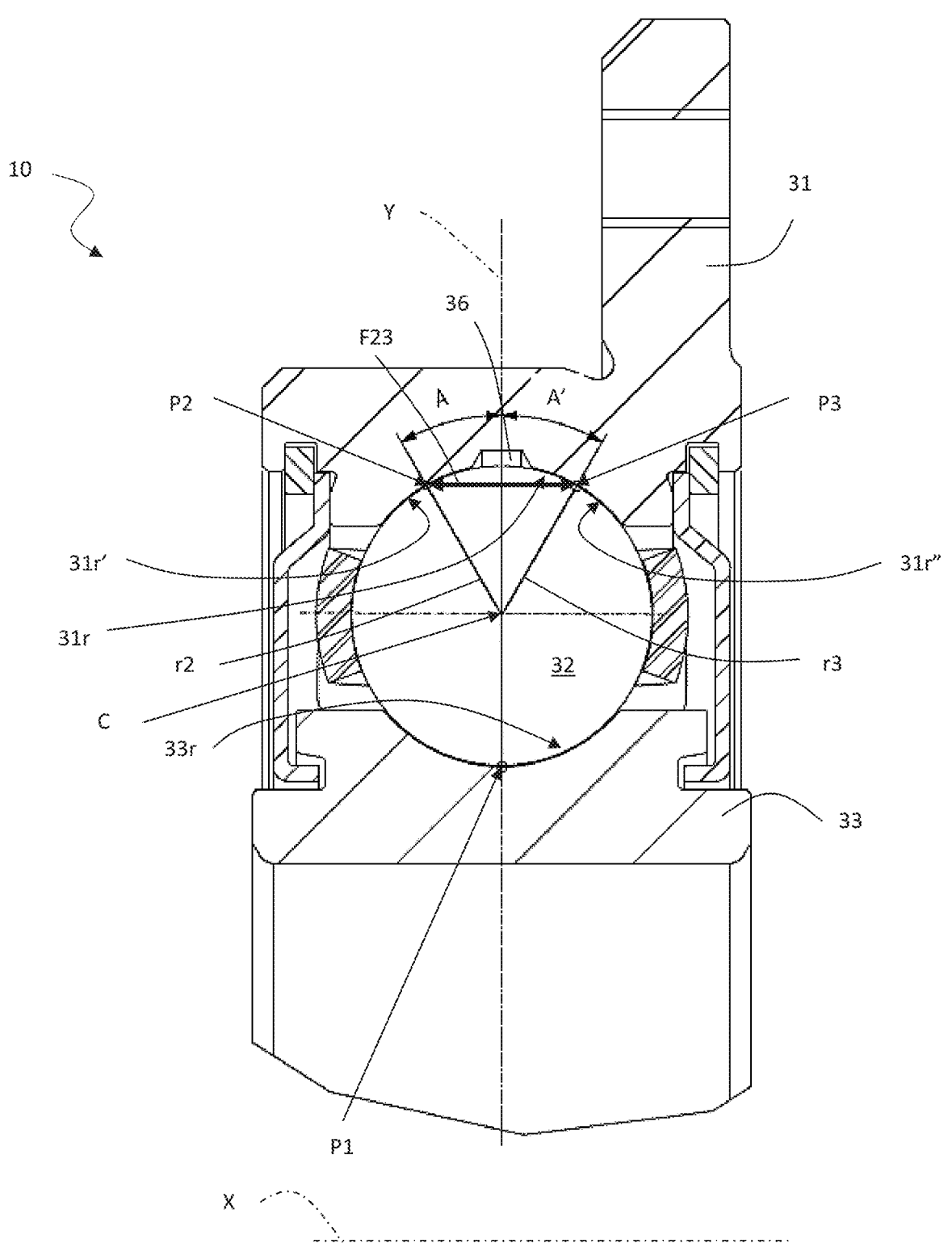
FIG. 4 is a magnified cross-sectional view of the bearing unit in FIG. 3.

In FIGS. 3 and 4, reference sign 10 denotes a bearing unit as a whole for use in the marble cutting sector, according to a first and preferred embodiment of the present disclosure.

The bearing unit 10 comprises:
a radially outer ring 31 that is rotary about a central axis X of rotation of the bearing unit 10 and stably connected to a pulley 20 (shown schematically only in FIG. 3) that is coaxial with the axis X,
a stationary radially inner ring 33,
a row 132 of rolling bodies 32, or balls 32, interposed between the radially outer ring 31 and the radially inner ring 33 to enable the relative rotation thereof,
a cage 34 to hold the balls 32 in position.

Throughout the present description and the claims, terms and expressions indicating position and orientation, such as "radial" and "axial", should be understood with reference to the axis X of rotation of the bearing unit 10 and to a plane Y of symmetry of the row of balls 32 that is transverse to the axis X.

The radially outer ring 31 is provided with a radially inner raceway 31r, while the radially inner ring 33 is provided with a radially outer raceway 33r to enable the row of balls 32 interposed between the radially outer ring 31 and the radially inner ring 33 to roll.

The bearing unit 10 is also provided with two sealing devices 35 arranged on axially opposing sides of the bearing unit 10, to seal said unit from the external environment.

According to the present disclosure, the bearing unit 10 has been designed to minimize the effects of the moments transmitted by the marble cutting machine through the pulley 20. For this purpose, each rolling body (or each ball) of the row of rolling bodies 32 has three contact points P1, P2, P3 with the raceways 31r, 33r.

In particular, between each ball 32 and the raceway 33r of the radially inner ring 33 there is a first contact point P1 aligned with a centre point C of symmetry, in the related plane Y of symmetry of the balls 32. On the other hand, between each ball 32 and the raceway 31r of the radially outer ring 31 there are respectively a second contact point P2 and a third contact point P3. In other words, the centre point C of symmetry is dynamically connected to the first contact point P1, the second contact point P2 and the third contact point P3 by a first, a second and a third line of action respectively.

The axial forces transmitted from the flange to the outer ring combined with the forces generated by the tilting moment described in the preceding paragraph pass through the points P2 and P3 of the raceway 31r. This double contact point, which limits the degrees of freedom of the outer ring 31, makes the system formed by the radially outer ring 31 and by the balls 32 much more rigid. The axial forces then pass through the balls and are discharged on the radially inner ring at the contact point P1. The main difference is that, while the points P2 and P3 are practically static on the raceway 31r, the point P1 can vary within the raceway, since a single contact point does not prevent possible axial movements between the radially inner ring 33 and the balls 32. On the other hand, the radial forces are necessarily transmitted from the radially outer ring 31 to the balls via two points (P2, P3), and are reduced or halved compared to the case in which there is a single contact point.

In other words, unlike in known solutions that have two contact points between the raceways and balls, the solution with three contact points creates a "hyperstatic" system between the raceways and balls. In this specific case, the radially outer ring 31 is much more rigid and prevented from moving relative to the balls 32 than the radially inner ring 33. Specifically, almost all of the axial components of the forces are exchanged, in equilibrium, along a line of action F23 parallel to the axis X of rotation, which minimizes the oscillations of the radially outer ring 31 of the bearing unit 10.

Although a greater number of contact points between the raceways and balls increases the degree of hyperstaticity of the system, it also results in an excessive increase in frictional resistance between the raceways and balls, without taking into account the technical difficulties involved in building the raceways with more than two contact points.

Advantageously, the second contact point P2 and the third contact point P3 are symmetrical about the plane Y of symmetry of the balls 32.

According to a dimensioning criterion supported by theoretical calculations and experimental tests, a second line of action r2, which joins the second contact point P2 with the centre C of the ball 32, and the plane Y form a first angle A that may be between 25° and 35°. Evidently, on account of the symmetry between the second point P2 and the third point P3, a third line of action r3, which joins the third contact point P3 with the centre C of the ball 32, and the plane Y also form a second angle A', which may be between 25° and 35° and which has the same value as the first angle A. Even more specifically, an optimal value of the angles A, A' is 30°.

This dimensioning is more effective in reducing the effects related to the axial net force Fa and the radial net force Fr transmitted by the marble cutting machine to the bearing unit 10.

Advantageously, the raceway 31r of the radially outer ring 31 has two annular portions 31r', 31r" that are separated from one another by a radially outer circumferential groove 36 and mirrored about the plane Y of symmetry of the balls 32. This feature (two raceway portions formed on a single inner ring) is advantageous in terms of the axial dimensions compared to the known solution in which the inner ring is formed by two mirrored half-rings. This is particularly important for bearing units 10 used in marble cutting machines. Indeed, since the bearings in marble cutting machines are mounted in series and very close to one another, a single ring with two annular raceway portions that are separate from one another helps to keep the axial dimensions of the bearing unit very small.

Advantageously, the circumferential groove 36 may contain lubricating grease to keep the raceway 31r lubricated. Furthermore, the presence of the circumferential groove 36 is useful since the tool used to machine the two mirrored annular raceway portions 31r', 31r" on the radially outer ring 31 requires a relief groove in an intermediate position half way around the ring. If this is not provided, a cusp or a point of discontinuity is created between the two raceway sections, creating a potential starting point for cracks. Since a relief groove is required, it is advantageous to dimension it to be used as a small reservoir for lubricating grease, which is undoubtedly useful in marble cutting machines, given the high temperatures involved in cutting operations.

Figure 5:
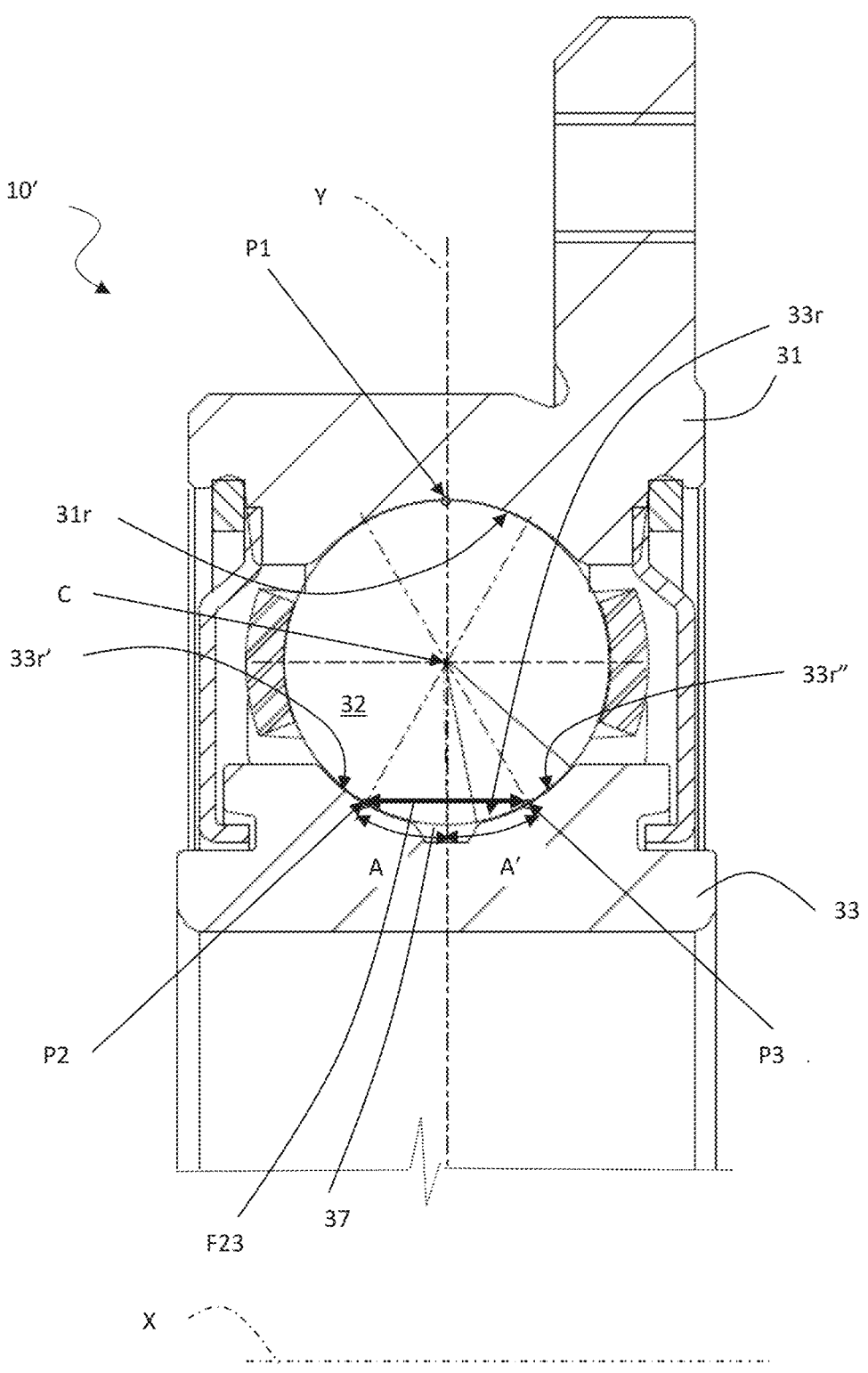
FIG. 5 is a magnified cross-sectional view of a second and preferred embodiment of the bearing unit according to the present disclosure.

FIG. 5 shows a bearing unit 10' according to a second embodiment of the present disclosure. According to this embodiment, between each ball 32 and the raceway 31r of the radially outer ring 31 there is a first contact point P1 aligned with the centre point C of the related ball 32 in the related plane Y of symmetry of the row of balls 32. On the other hand, between each ball 32 and the raceway 33r of the radially inner ring 33 there are respectively a second contact point P2 and a third contact point P3. In other words, the centre point C of symmetry is dynamically connected to the first contact point P1, the second contact point P2 and the third contact point P3 by a first, a second and a third line of action respectively.

The forces exchanged between the raceways 31r, 33r and the balls 32 tend to be more symmetrical than as described above. In this case, it is the radially inner ring 33, which has two contact points with each ball 32, that is much more rigid and constrained than the radially outer ring 31.

As a result, in this second embodiment the forces exchanged between the races and the balls are also distributed over three points, thereby eliminating or minimizing the tilting moment on the bearing unit 10 caused by the eccentric forces applied to the pulley 20. Unlike the first embodiment, however, the raceway 31r of the radially outer ring 31 has a single contact point with the balls 32. Consequently, the axial forces are still exchanged along the line of action F23 parallel to the axis X of rotation, which however joins the second contact point P2 and the third contact point P3 between the ball 32 and the raceway 33r of the radially inner ring 33 in this second embodiment.

Compared to the first embodiment of the present disclosure, therefore, this second solution does not have the beneficial effect of minimizing the oscillations of the radially outer ring 31 of the bearing unit 10. This lesser benefit can be compensated by reducing the osculation, i.e. the ratio between the radius of curvature of the raceway 31r and the external diameter of the balls. However, this technical solution involves greater pressure and stress on the raceway, which shortens service life and increases friction. The osculation ratio can therefore be reduced from 0.54 to 0.51, without ever dropping below 0.51 to avoid excessively high stress values.

Advantageously, the second contact point P2 and the third contact point P3 are symmetrical about the plane Y of symmetry of the balls 32.

The same dimensioning criterion used to define the position of the second contact point P2 and the third contact point P3 may also be used for this solution: a second line of action r2, which joins the second contact point P2 with the centre C of the ball 32, and the plane Y form a first angle A that may be between 25° and 35°, and a third line of action r3, which joins the third contact point P3 with the centre C of the ball 32, and the plane Y form a second angle A', which may be between 25° and 35° and which has the same value as the first angle A. Even more specifically, an optimal value of the angles A, A' is 30°.

Advantageously, in this second embodiment of the present disclosure, the raceway 33r of the radially inner ring 33 has two annular portions 33r', 33r'' that are separated from one another by a radially inner circumferential groove 37 and mirrored about the plane Y of symmetry of the balls 32. The circumferential groove 37 can advantageously contain lubricating grease to keep the raceway 33r lubricated.

The circumferential groove 37 is provided for the same technological reasons as set out above with reference to the first embodiment.

The dimensions of the circumferential grooves 36, 37 must be optimized so that they are firstly large enough to contain a significant quantity of lubricating grease, and secondly not so large as to excessively reduce the total surface of the raceways, and in particular the contact zones near to the contact points P2, P3.

In summary, the present disclosure enables the contact forces between the rolling bodies 32 and the raceways 31r, 33r to be distributed over three contact points P1, P2, P3. This helps to minimize the axial dimensions of the bearing unit since only one inner ring is required, instead of a pair of inner rings. Simultaneously, the presence of three contact points between the raceways and the rolling elements helps to increase the resistance to the moments caused by the eccentric radial forces caused by the action of the diamond wires, and to better distribute the radial forces on the bearing unit, which are split between two contact points on at least one ring. For this purpose, the solution with two contact points on the radially outer ring 31 provides a further advantage. The outer ring is swaged with a grinding relief on the diametrically outer surface that is used when grinding that surface. In terms of mechanical strength, this grinding relief constitutes a defect that compromises strength, especially against tilting moments. The presence of two contact points in this case facilitates the distribution of the forces, since these forces are not directed towards a single point.

This increases the service life of the bearing unit and improves the quality of the cut of the marble slabs.

Furthermore, the circumferential grooves 36, 37 formed on one or other of the two raceways 31r, 33r, as required by the aforementioned technology, advantageously act as containers for the lubricating grease, and this helps to keep the corresponding raceway well lubricated.

Numerous other variants exist in addition to the embodiments of the present disclosure described above. Said embodiments are provided solely by way of example and do not limit the scope of the present disclosure, its applications or its possible configurations. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A cutting machine comprising:
a bearing unit comprising:
   a radially outer ring rotatable with respect to an axis of rotation and provided with a radially inner raceway;
   a radially inner ring that is stationary and is provided with a radially outer raceway; and
   a row of rolling bodies interposed between the radially outer ring and the radially inner ring, each rolling body having three contact points with the radially inner and outer raceways;
a cutting wire; and
a pulley connected to the radially outer ring of the bearing unit and coaxial with the axis of rotation of the bearing unit, the pulley in contact with the cutting wire and configured to guide the cutting wire as the pulley rotates about the axis of rotation.

2. The cutting machine according to claim 1, wherein:
each rolling body of the row of rolling bodies is arranged in dynamic contact with a first raceway of the radially inner and radially outer raceways, at a first, single, contact point, and
each rolling body of the row of rolling bodies is arranged in dynamic contact with a second raceway of the radially inner and radially outer raceways, at respective second and third contact points.

3. The cutting machine according to claim 2, wherein each rolling body of the row of rolling bodies has a respective center point of symmetry that is arranged on a plane of symmetry of the row of rolling bodies and is dynamically connected to the respective second contact point and the respective third contact point by means of second and third lines of action, respectively, that form, with the plane of symmetry, respective second and third angles that are equal to each other, each second and third angle having a value between 25° and 35°.

4. The cutting machine according to claim 3, wherein the second raceway comprises two annular portions separated from one another and mirrored with respect to the plane of symmetry.

5. The cutting machine according to claim 4, wherein the second raceway is a radially inner raceway, and is provided with a radially external circumferential groove configured to contain lubricating grease.

6. The cutting machine according to claim 4, wherein the second raceway is a radially outer raceway, and is provided with a radially inner circumferential groove configured to contain lubricating grease.

7. The cutting machine according to claim 6, wherein the ratio between the radius of curvature of the second raceway and the outer diameter of the balls ranges between 0.51 and 0.54.

8. The cutting machine according to claim 3, wherein each second and third angle have a value of 30°.

9. The cutting machine according to claim 2, wherein the second raceway is a radially inner raceway and is provided with a radially external circumferential groove configured to contain lubricating grease, the radially external circumferential groove disposed axially between the second and third contact points.

10. The cutting machine according to claim 2, wherein the second raceway is a radially outer raceway and is provided with a radially inner circumferential groove configured to contain lubricating grease, the radially inner circumferential groove disposed axially between the second and third contact points.

* * * * *